United States Patent
Bisley et al.

(10) Patent No.: US 7,796,467 B2
(45) Date of Patent: Sep. 14, 2010

(54) GENERALIZED 3D SURFACE MULTIPLE PREDICTION

(75) Inventors: Richard Bisley, Mt Lawley (AU); Ian Moore, Trigg (AU); William H. Dragoset, Jr., Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 781 days.

(21) Appl. No.: 10/599,414

(22) PCT Filed: Jul. 16, 2004

(86) PCT No.: PCT/US2004/023119

§ 371 (c)(1),
(2), (4) Date: May 25, 2007

(87) PCT Pub. No.: WO2005/103764

PCT Pub. Date: Nov. 3, 2005

(65) Prior Publication Data

US 2008/0043573 A1     Feb. 21, 2008

Related U.S. Application Data

(60) Provisional application No. 60/560,129, filed on Apr. 7, 2004.

(51) Int. Cl.
*G01V 1/38* (2006.01)

(52) U.S. Cl. ........................................... 367/24

(58) Field of Classification Search ................. 367/15, 367/24
See application file for complete search history.

(56) References Cited

U.S. PATENT DOCUMENTS

| | | | |
|---|---|---|---|
| 3,371,310 A | 2/1968 | Daniel | |
| 4,887,243 A | 12/1989 | Pann | |
| 5,987,389 A * | 11/1999 | Ikelle et al. | 702/17 |
| 6,094,620 A * | 7/2000 | Gasparotto et al. | 702/14 |
| 6,169,959 B1 | 1/2001 | Dragoset, Jr. | |
| 6,678,207 B2 * | 1/2004 | Duren | 367/24 |
| 6,735,527 B1 * | 5/2004 | Levin | 702/14 |
| 7,181,347 B2 * | 2/2007 | Moore | 702/14 |
| 7,505,360 B2 * | 3/2009 | Bisley et al. | 367/24 |

OTHER PUBLICATIONS

Levin, "Prestack poststack 3D multiple prediction," *72$^{nd}$ SEG Ann. Mtg.*, Salt Lake City, Utah, pp. 2110-2113, Oct. 6-11, 2002.
Sun, "Anti-aliasing multiple prediction beyond two dimensions," *Stanford Exploration Project, Report 100*, pp. 159-171, 1999.

* cited by examiner

*Primary Examiner*—Scott A Hughes

(57) ABSTRACT

A method and apparatus for predicting a plurality of surface multiples for a plurality of target traces in a record of seismic data. In one embodiment, the method includes creating a file containing information regarding a plurality of pairs of recorded traces. Each pair of recorded traces is substantially closest to a desired shot-side trace and a desired receiver-side trace. The method further includes convolving the pairs of recorded traces to generate a plurality of convolutions and stacking the convolutions for each target trace.

19 Claims, 6 Drawing Sheets

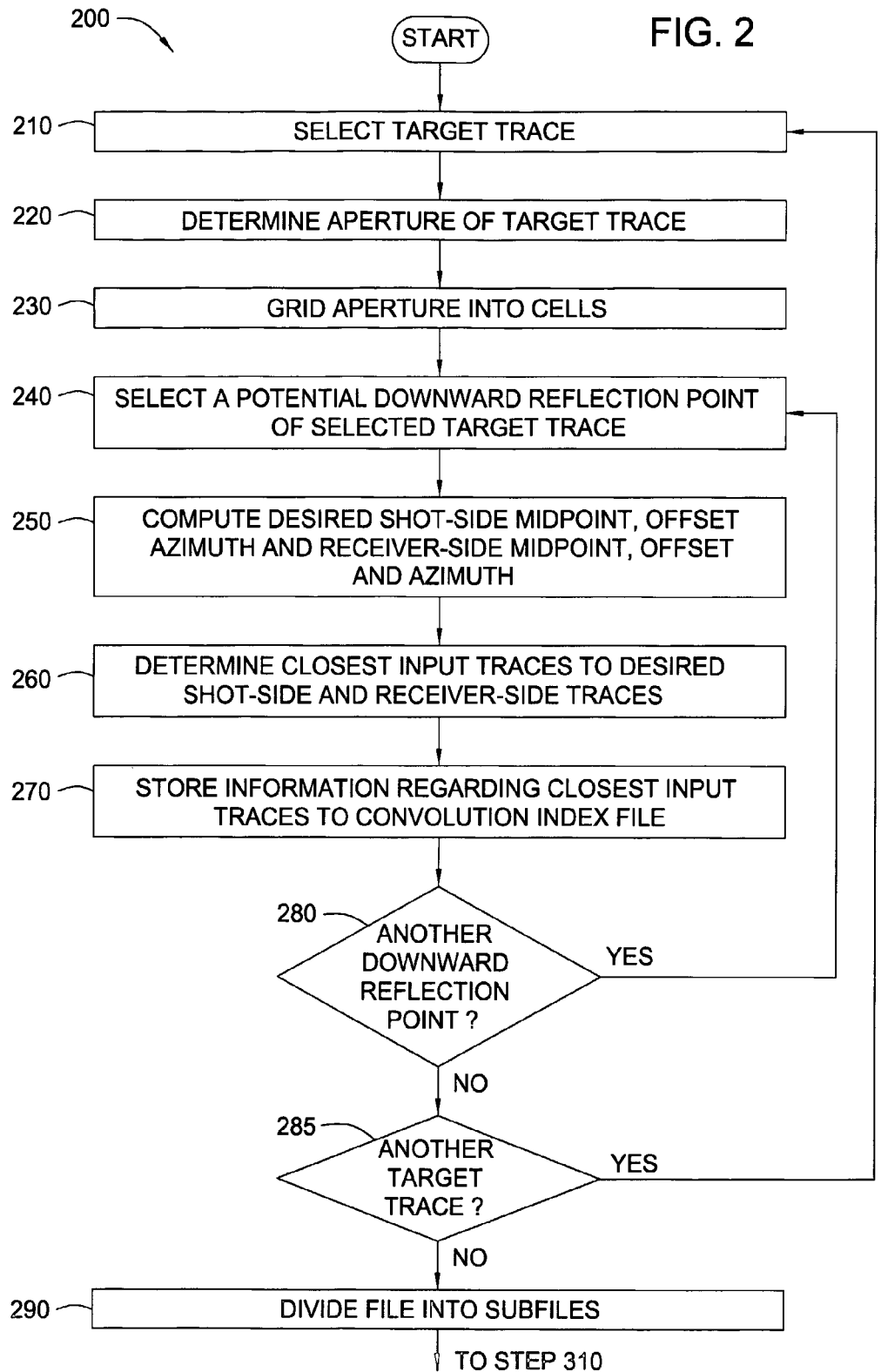

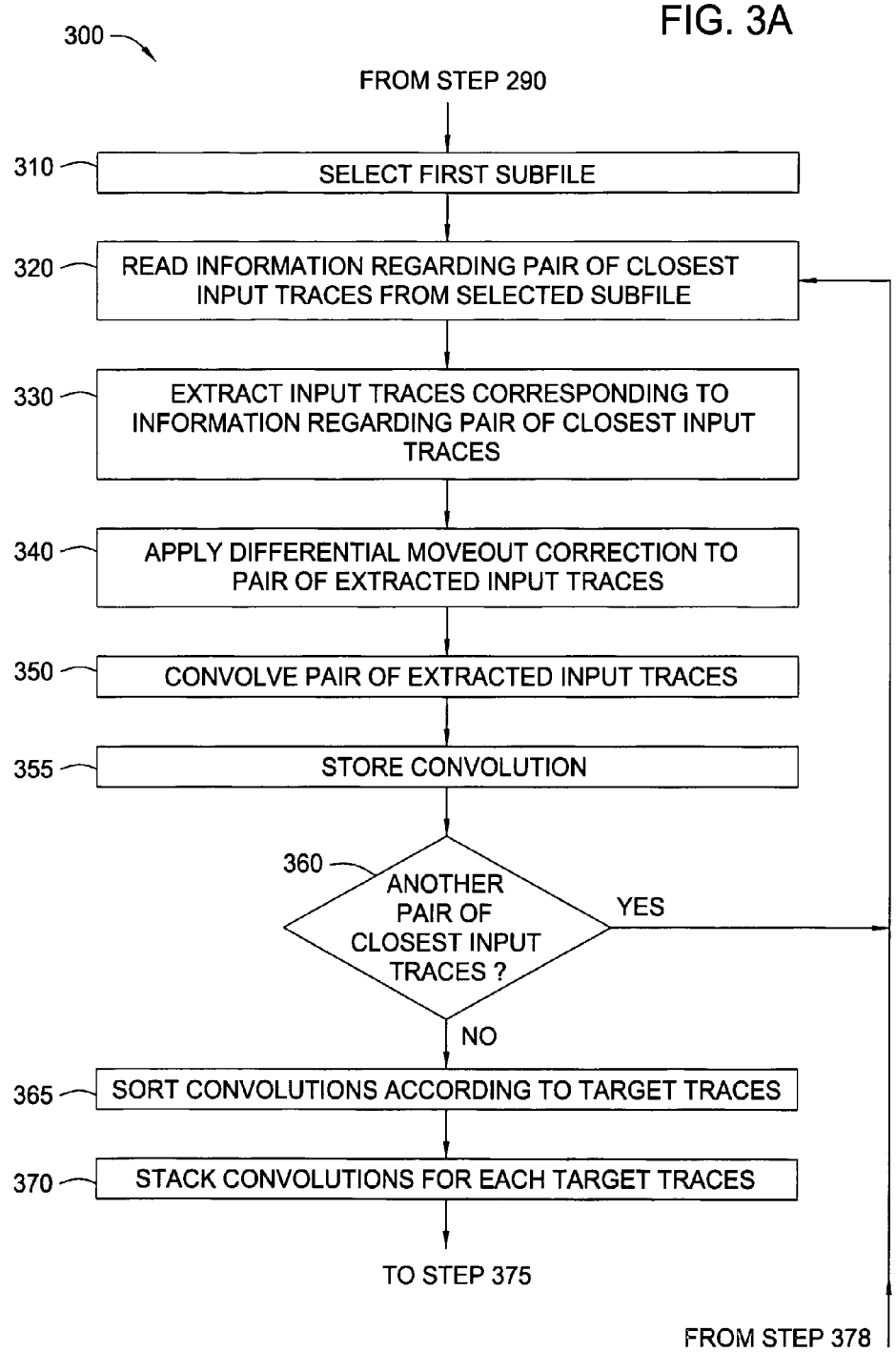

GENERALIZED 3D SURFACE MULTIPLE PREDICTION

CROSS-REFERENCE TO RELATED APPLICATIONS

This application claims benefit of U.S. provisional patent application Ser. No. 60/560,129, filed Apr. 7, 2004, which is herein incorporated by reference.

BACKGROUND OF THE INVENTION

1. Field of the Invention

Embodiments of the present invention generally relate to marine seismic surveying and, more particularly, to a method for attenuating the effect of surface multiples in seismic signals.

2. Description of the Related Art

Seismic surveying is a method for determining the structure of subterranean formations in the earth. Seismic surveying typically utilizes seismic energy sources which generate seismic waves and seismic receivers which detect seismic waves. The seismic waves propagate into the formations in the earth, where a portion of the waves reflects from interfaces between subterranean formations. The amplitude and polarity of the reflected waves are determined by the differences in acoustic impedance between the rock layers comprising the subterranean formations. The acoustic impedance of a rock layer is the product of the acoustic propagation velocity within the layer and the density of the layer. The seismic receivers detect the reflected seismic waves and convert the reflected waves into representative electrical signals. The signals are typically transmitted by electrical, optical, radio or other means to devices which record the signals. Through analysis of the recorded signals (or traces), the shape, position and composition of the subterranean formations can be determined.

Marine seismic surveying is a method for determining the structure of subterranean formations underlying bodies of water. Marine seismic surveying typically utilizes seismic energy sources and seismic receivers located in the water which are either towed behind a vessel or positioned on the water bottom from a vessel. The energy source is typically an explosive device or compressed air system which generates seismic energy, which then propagates as seismic waves through the body of water and into the earth formations below the bottom of the water. As the seismic waves strike interfaces between subterranean formations, a portion of the seismic waves reflects back through the earth and water to the seismic receivers, to be detected, transmitted, and recorded. The seismic receivers typically used in marine seismic surveying are pressure sensors, such as hydrophones. Additionally, though, motion sensors, such as accelerometers may be used. Both the sources and receivers may be strategically repositioned to cover the survey area.

Seismic waves, however, reflect from interfaces other than just those between subterranean formations, as would be desired. Seismic waves also reflect from the water bottom and the water surface, and the resulting reflected waves themselves continue to reflect. Waves which reflect multiple times are called "multiples". Waves which reflect multiple times in the water layer between the water surface above and the water bottom below are called "water-bottom multiples". Water-bottom multiples have long been recognized as a problem in marine seismic processing and interpretation, so multiple attenuation methods based on the wave equation have been developed to handle water-bottom multiples. However, a larger set of multiples containing water-bottom multiples as a subset can be defined. The larger set includes multiples with upward reflections from interfaces between subterranean formations in addition to upward reflections from the water bottom. The multiples in the larger set have in common their downward reflections at the water surface and thus are called "surface multiples". FIG. 1, discussed below, provides examples of different types of reflections.

FIG. 1 shows a diagrammatic view of marine seismic surveying. The procedure is designated generally as 100. Subterranean formations to be explored, such as 102 and 104, lie below a body of water 106. Seismic energy sources 108 and seismic receivers 110 are positioned in the body of water 106, typically by one or more seismic vessels (not shown). A seismic source 108, such as an air gun, creates seismic waves in the body of water 106 and a portion of the seismic waves travels downward through the water toward the subterranean formations 102 and 104 beneath the body of water 106. When the seismic waves reach a seismic reflector, a portion of the seismic waves reflects upward and a portion of the seismic waves continues downward. The seismic reflector can be the water bottom 112 or one of the interfaces between two subterranean formations, such as interface 114 between formations 102 and 104. When the reflected waves traveling upward reach the water/air interface at the water surface 116, a majority portion of the waves reflects downward again. Continuing in this fashion, seismic waves can reflect multiple times between upward reflectors, such as the water bottom 112 or formation interfaces below, and the downward reflector at the water surface 116 above, as described more fully below. Each time the reflected waves propagate past the position of a seismic receiver 110, the receiver 110 senses the reflected waves and generates representative signals.

Primary reflections are those seismic waves which have reflected only once, from the water bottom 112 or an interface between subterranean formations, before being detected by a seismic receiver 110. An example of a primary reflection is shown in FIG. 1 by raypaths 120 and 122. Primary reflections contain the desired information about the subterranean formations which is the goal of marine seismic surveying. Surface multiples are those waves which have reflected multiple times between the water surface 116 and any upward reflectors, such as the water bottom 112 or formation interfaces, before being sensed by a receiver 110. An example of a surface multiple which is specifically a water bottom multiple is shown by raypaths 130, 132, 134 and 136. The point on the water surface 116 at which the wave is reflected downward is generally referred to as the downward reflection point 133. The surface multiple starting at raypath 130 is a multiple of order one, since the multiple contains one reflection from the water surface 116. Two examples of general surface multiples with upward reflections from both the water bottom 112 and formation interfaces are shown by raypaths 140, 142, 144, 146, 148 and 150 and by raypaths 160, 162, 164, 166, 168 and 170. Both of these latter two examples of surface multiples are multiples of order two, since the multiples contain two reflections from the water surface 116. In general, a surface multiple is of order i if the multiple contains i reflections from the water surface 116. Surface multiples are extraneous noise which obscures the desired primary reflection signal.

Surface multiple attenuation is a prestack inversion of a recorded wavefield which removes all orders of all surface multiples present within the marine seismic signal. Unlike some wave-equation-based multiple-attenuation algorithms, surface multiple attenuation does not require any modeling of or assumptions regarding the positions, shapes and reflection coefficients of the multiple-causing reflectors. Instead, surface multiple attenuation relies on the internal physical consistency between primary and multiple events that must exist in any properly recorded marine data set. The information needed for the surface multiple attenuation process is already contained within the seismic data.

Various prior art methods have been tried for removal of surface multiples from recorded traces. It has been noted, for example, that the travel time for a water bottom multiple is a function of the "offset", the distance between the source and receiver, and the number of times the multiple reflects from the surface. For example, if the multiple reflects from the surface once before being received by the microphone and the offset is zero, the multiple's travel time is exactly twice that of the principal waves. This fact has been used in various schemes to remove multiples.

Other methods involve complex ray tracing schemes which generate a synthetic multiple wave and subtract it from the actual wave to obtain a supposedly multiple free record. However, these methods are very awkward in that they require significant knowledge of the subsea structure as well as the ocean bottom configuration before the synthetic wave can be generated. Similar synthetic multiples can be generated using more accurate methods not directly involving ray tracing, e.g., field propagation techniques, but again these require detailed knowledge of at least the ocean bottom, as well as the shape of the subsea interfaces, and so are not as practical as would be desired.

Current surface multiple prediction algorithms require convolutions of pairs of traces, for which the receiver location for one trace of the pair is coincident with the shot location for the other trace. Since source and receiver locations in recorded data are seldom precisely coincident, it is common practice to regularize the datasets to a nominal geometry such that this coincidence of source and receiver locations is achieved. The multiples are then predicted for this regular geometry, and then deregularized to the original geometry before subtraction. Unfortunately, the regularization and (especially) the deregularization processes are often inaccurate, which often lead to significant errors in the predicted multiples.

Therefore, a need exists in the art for an improved method for removing the record of multiple surface reflection events from seismic records for seismic data processing purposes.

SUMMARY OF THE INVENTION

One or more embodiments of the present invention aim to minimize errors caused by regularization and deregularization processes by minimizing involvement of the regularization process and avoiding the deregularization process completely. In one embodiment, the present invention works with data from many subsurface lines at once to minimize the regularization processes. As such, the present invention may involve convolutions of traces from different subsurface lines. In another embodiment, in order to maintain the efficiency associated with subsurface line-based processing, the algorithm of the present invention is formulated to operate on pairs of subsurface lines at a time.

In yet another embodiment, the present invention is directed to a generalized implementation of a three dimensional surface-related multiple prediction (SMP) algorithm, which makes no assumptions about the regularity or distribution of traces in the recorded dataset, i.e., there is no concept of a nominal geometry. As such, the recorded dataset is simply treated as a collection of traces defined by their source and receiver locations. In this manner, one or more embodiments of the present invention are configured to predict multiples for any set of traces similarly defined by their source and receiver locations. In particular, the present invention may predict multiples at the correct location, offset and azimuth.

One or more embodiments of the present invention may also be designed to take into account all of the irregularities in the acquisition geometry, which may be particularly beneficial in addressing cable feathering. The accuracy of the predicted multiples may be dependent on the distribution of traces in the recorded dataset.

Accordingly, one or more embodiments of the invention are directed to a method for predicting a plurality of surface multiples for a plurality of target traces in a record of seismic data. In one embodiment, the method includes creating a file containing information regarding a plurality of pairs of recorded traces. Each pair of recorded traces is substantially closest to a desired shot-side trace and a desired receiver-side trace. The method further includes convolving the pairs of recorded traces to generate a plurality of convolutions and stacking the convolutions for each target trace.

In another embodiment, the method includes (a) selecting a target trace; (b) selecting a potential downward reflection point for the selected target trace; (c) computing at least one of a desired shot-side midpoint, offset and azimuth, and at least one of a desired receiver-side midpoint, offset and azimuth using the selected potential downward reflection point and the selected target trace. The desired shot-side midpoint, offset and azimuth define a desired shot-side trace. The desired receiver-side midpoint, offset and azimuth define a desired receiver-side trace. The method further includes (d) determining a pair of recorded traces substantially closest to the desired shot-side trace and to the desired receiver-side trace; and (e) convolving the pair of recorded traces to generate a convolution.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 illustrates a flow diagram of the first stage in a method for performing a three dimensional surface multiple prediction in accordance with one or more embodiments of the invention.

FIGS. 3A and 3B illustrate a flow diagram of the second stage in a method for performing a three dimensional surface multiple prediction in accordance with one or more embodiments of the invention.

DETAILED DESCRIPTION

Figure 4:
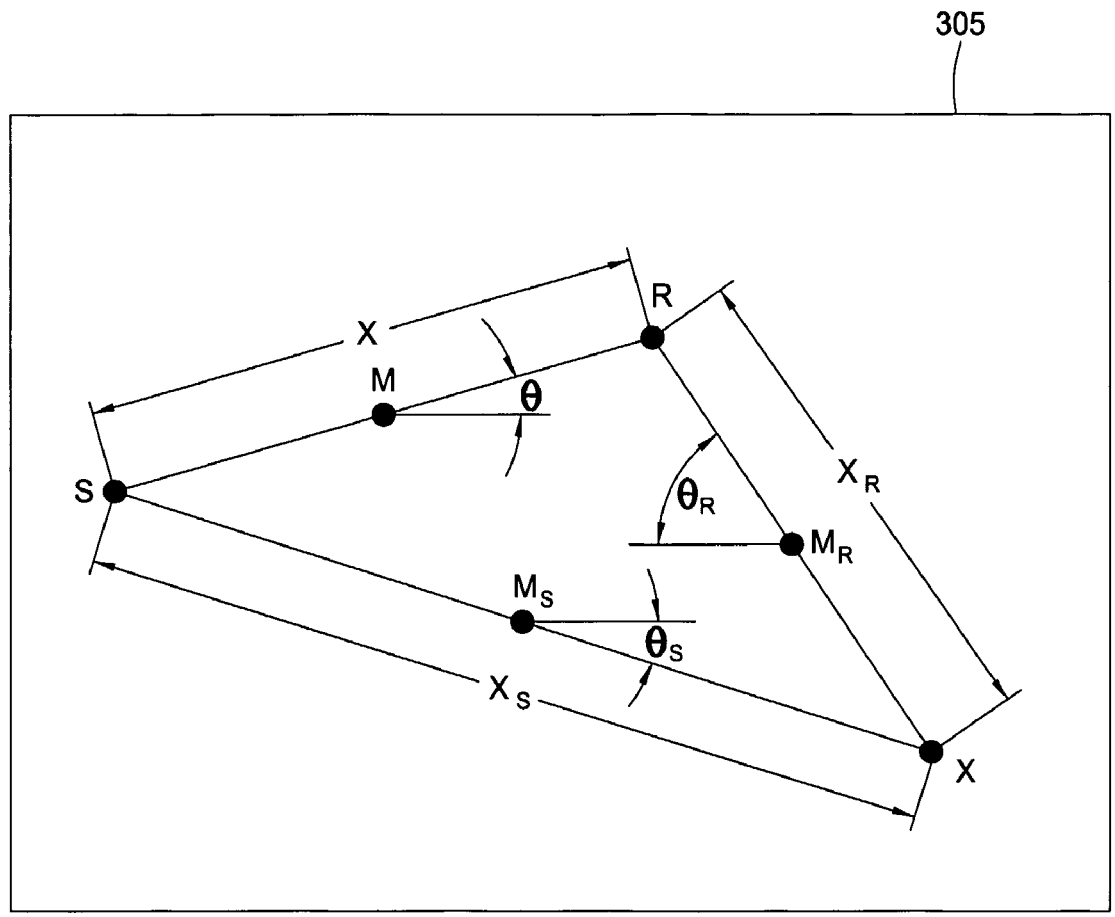
FIG. 4 illustrates a plan view of an acquisition geometry in accordance with one or more embodiments of the invention.

FIG. 2 illustrates a flow diagram of the first stage 200 in a method for performing a three dimensional surface multiple prediction in accordance with one or more embodiments of the invention. At step 210, a target trace is selected. An example of a selected target trace is illustrated in FIG. 4 as trace (S, R). Target traces define the locations at which the multiples are to be predicted. At step 220, an aperture 305 for the selected target trace is determined or defined. The aperture 305 may be a rectangular area and centered on a midpoint location M of the target trace. Other geometrical shapes for the aperture 305 are contemplated by the embodiments of the invention. The aperture 305 is defined to include substantially all the potential downward reflection points (DRPS) of the surface multiples for the target trace. As an example, a potential downward reflection point X is illustrated in FIG. 4. At step 230, the aperture 305 is gridded into a plurality of cells. In one embodiment, the midpoint of the target trace is located on one of the grid nodes (cell centers). The grid spacing may be arbitrary. The grid nodes define the potential DRPs for the target trace.

At step 240, a potential DRP, such as a first DRP, for the selected target trace is selected. At step 250, the desired shot-side midpoint Ms, offset Xs and azimuth θs and the desired receiver-side midpoint $M_R$, offset $X_R$ and azimuth $θ_R$ are computed. Ms is the midpoint location between the source and the selected potential DRP. Offset Xs is the horizontal distance between the selected potential DRP and the source S. Azimuth θs is defined as the angle between the line that connects the source S and the selected potential DRP and some fixed direction, which is typically the in-line direction. $M_R$ is the midpoint location between the receiver R and the selected potential DRP. Offset $X_R$ is the horizontal distance between the selected potential DRP and the receiver R. Azimuth $θ_R$ is defined as the angle between the line that connects the receiver R and the selected potential DRP and some fixed direction, which is typically the in-line direction. In one embodiment, the desired shot-side midpoint Ms, offset Xs and azimuth θs and the desired receiver-side midpoint $M_R$, offset $X_R$ and azimuth $θ_R$ are computed based on the selected target trace and the selected potential DRP. The midpoints, offsets and azimuths together define the desired shot-side trace (S, X) and the desired receiver-side trace (X, R).

At step 260, the input trace closest to the desired shot-side trace and the input trace closest to the desired receiver-side trace are determined. In one embodiment, the closest input traces are determined by minimizing an objective function, which defines the closeness of two traces based on their midpoints, offsets and azimuths. An example of an objective function is $$D^2 = |\Delta m|^2 + w_x |\Delta x|^2 + w_θ |\Delta θ|^2$$

where D measures the closeness between the traces, Δm, Δx and Δθ are the differences in midpoint, offset and azimuth respectively, and $w_x$ and $w_θ$ are weights defining the relative importance of errors in offsets and azimuths as compared to the error in midpoints. Notably, $w_x$ is dimensionless, whereas $w_θ$ has dimensions of $L^2$. In one embodiment, $w_θ$ is set to zero due to poor azimuth coverage of the input dataset. In another embodiment, there may be a minimum value for the minimized objective function, above which there is deemed to be no matching trace.

At step 270, information regarding the closest input traces is stored in a file, which may be referred to as a convolution index file (CIF). For example, such information may include identifiers for the closest input traces, their associated subsurface lines, the selected potential downward reflection point X, the desired shot-side midpoint Ms, offset Xs and azimuth θs, the desired receiver-side midpoint $M_R$, offset $X_R$ and azimuth $θ_R$, and the selected target trace to be predicted. At step 280, a determination is made as to whether the aperture includes another potential DRP for the selected target trace. If the answer is in the affirmative, then processing returns to step 240, at which another potential DRP is selected. If the answer is in the negative, then processing continues to step 285, at which a determination is made as to whether another target trace exists. If the answer is in the affirmative, then processing returns to step 210, at which another target trace is selected. If the answer is in the negative, then processing continues to step 290, at which the CIF is divided into one or more subfiles according to pairs of subsurface lines containing closest input traces. In this manner, each subfile contains information directed to only a pair of subsurface lines, wherein each subsurface line contains an input trace closest to either a desired shot-side trace or a desired receiver-side trace. The order of subsurface lines in the pair is not critical.

Figure 1:
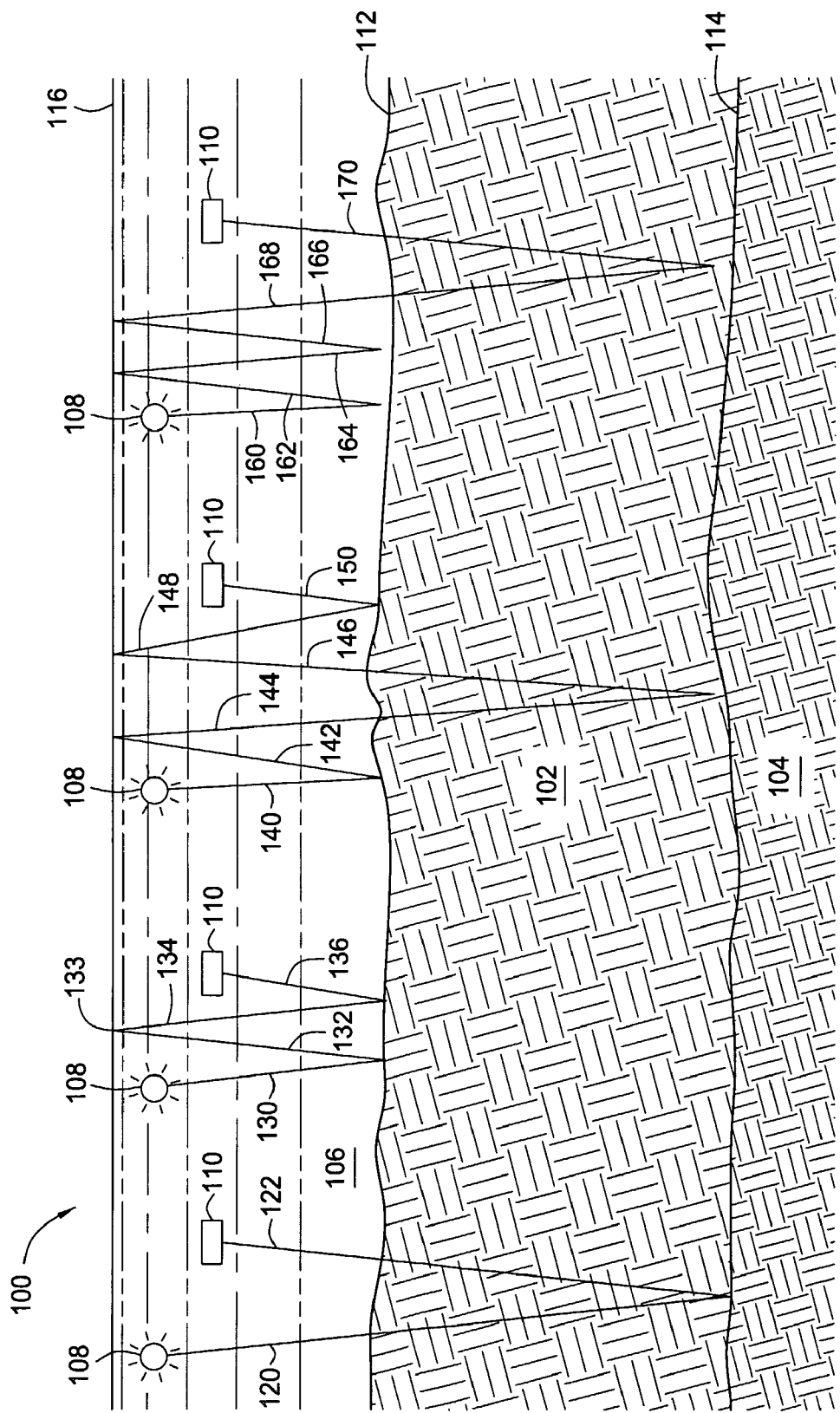
FIG. 1 illustrates a diagrammatic view of marine seismic surveying.
Figure 3B:
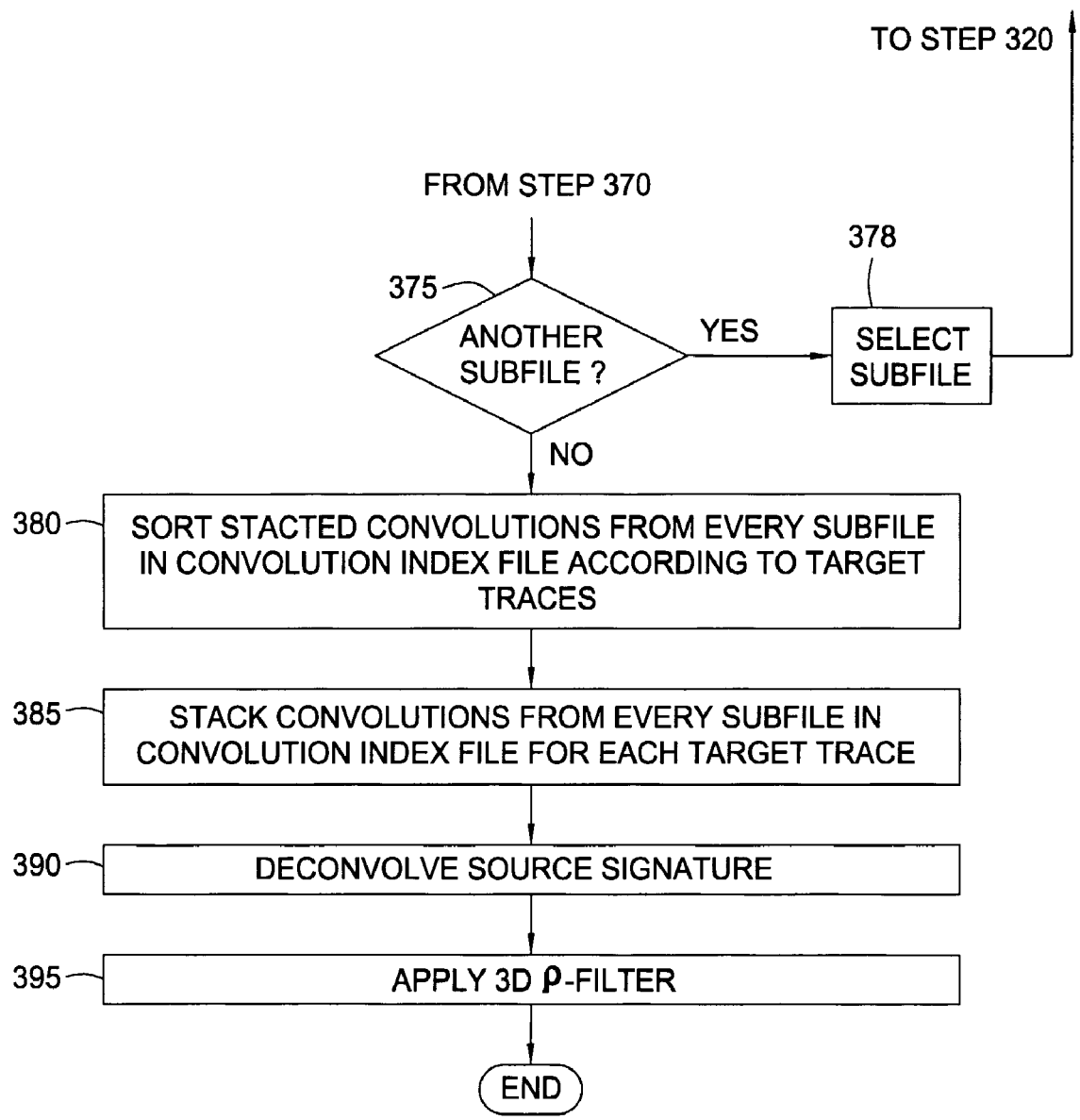

FIGS. 3A and 3B illustrate a flow diagram of the second stage 300 in a method for performing a three dimensional surface multiple prediction in accordance with one or more embodiments of the invention. At step 310, the first subfile is selected. At step 320, information regarding a pair of input traces closest to a desired shot-side trace and a desired receiver-side trace for a selected target trace is read from the selected subfile. At step 330, a pair of input traces corresponding to the information regarding the pair of closest input traces is extracted from a set of recorded seismic data.

The recorded set of seismic data may be stored in any file or data storage commonly known by persons of ordinary skill in the art. The set of recorded seismic data may be extrapolated to zero offset. The set of recorded seismic data may be a collection of prestack traces defined by midpoint, offset and azimuth. Each trace in the recorded seismic data set may have a subsurface line identifier and a unique trace identifier that can be used to identify the input trace within the recorded seismic data set. The set of recorded seismic data may be organized into subsurface lines, or any other subdivisions, such as sail lines.

At step 340, a differential moveout correction is applied to the pair of extracted recorded traces to correct the offsets of the extracted recorded traces to the desired shot-side offset and the desired receiver-side offset. At step 350, the pair of corrected and extracted recorded traces are convolved. At step 355, the convolution is stored.

At step 360, a determination is made as to whether the selected subfile contains another pair of input traces to be convolved. If the answer is in the affirmative, then processing returns to step 320. If the answer is in the negative, then processing continues to step 365, at which the convolutions are sorted according to target traces. At step 370, all the convolutions for each target trace are stacked together to obtain a single, stacked convolution per target trace for the selected subfile.

At step 375, a determination is made as to whether another subfile of the CIF exists. If the answer is in the affirmative, then that subfile is selected (step 378) and processing returns to step 320. If the answer is in the negative, then processing continues to step 380, at which all the stacked convolutions from every subfile in the CIF are sorted according to target traces. At step 385, all the stacked convolutions from every subfile in the CIF are stacked for each target trace to obtain a single, stacked convolution per target trace from all subfiles.

At step 390, the source signature is deconvolved according to techniques commonly known by persons of ordinary skill in the art. At step 395, a three dimensional ρ-filter may be applied to correct for the stacking effect on the wavelet according to techniques commonly known by persons of ordinary skill in the art.

Figure 5:
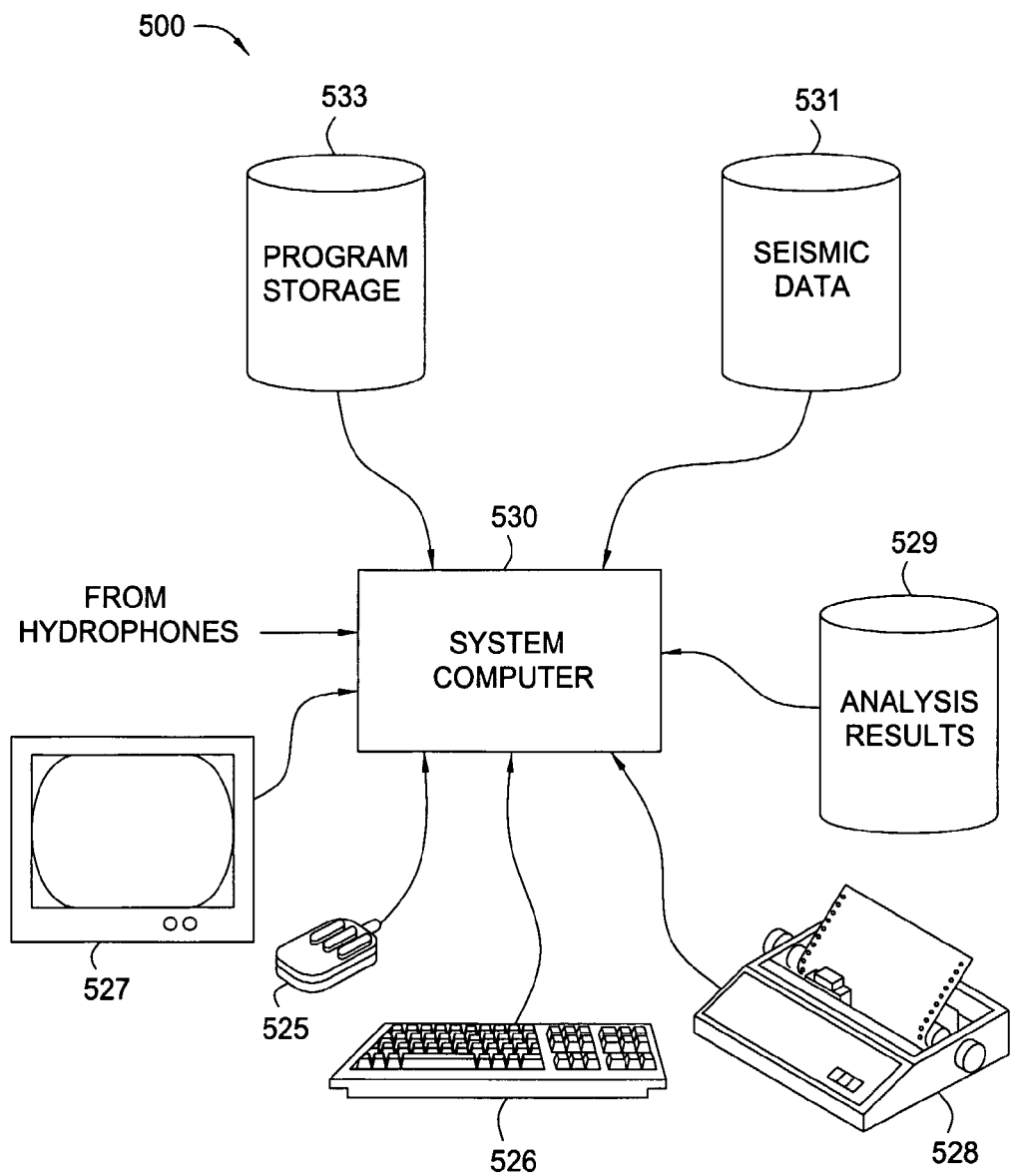
FIG. 5 illustrates a computer network into which various embodiments of the invention may be implemented.

FIG. 5 illustrates a computer network 500, into which embodiments of the invention may be implemented. The computer network 500 includes a system computer 530, which may be implemented as any conventional personal computer or workstation, such as a UNIX-based workstation. The system computer 530 is in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one embodiment, seismic data from hydrophones are stored in disk storage device 531. The system computer 530 may retrieve the appropriate data from the disk storage device 531 to perform the 3-D surface multiple prediction according to program instructions that correspond to the methods described herein. The program instructions may be written in a computer programming language, such as C++, Java and the like. The program instructions may be stored in a computer-readable memory, such as program disk storage device 533. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 530 presents output primarily onto graphics display 527, or alternatively via printer 528. The system computer 530 may store the results of the methods described above on disk storage 529, for later use and further analysis. The keyboard 526 and the pointing device (e.g., a mouse, trackball, or the like) 525 may be provided with the system computer 530 to enable interactive operation.

The system computer 530 may be located at a data center remote from the survey region. The system computer 530 is in communication with hydrophones (either directly or via a recording unit, not shown), to receive signals indicative of the reflected seismic energy. These signals, after conventional formatting and other initial processing, are stored by the system computer 530 as digital data in the disk storage 531 for subsequent retrieval and processing in the manner described above. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to embodiments of the present invention, other and further embodiments of the invention may be devised without departing from the basic scope thereof, and the scope thereof is determined by the claims that follow.

What is claimed is:

1. A method for predicting a plurality of surface multiples for a plurality of target traces in a record of seismic data, comprising:
   computing, using a computer, at least one of a desired shot-side midpoint, offset and azimuth, and at least one of a desired receiver-side midpoint, offset and azimuth based on a selected target trace and a selected potential downward reflection point, wherein the desired shot-side midpoint, offset and azimuth define a desired shot-side trace and the desired receiver-side midpoint, offset and azimuth define a desired receiver-side trace;
   creating a file containing information regarding a plurality of pairs of recorded traces, wherein each pair of recorded traces is substantially closest to the desired shot-side trace and the desired receiver-side trace;
   convolving the pairs of recorded traces to generate a plurality of convolutions; and
   stacking the convolutions for each target trace.

2. The method of claim 1, wherein creating the file containing the information regarding the pairs of recorded traces comprises:
   a receiving the selected target trace; and
   determining an aperture for the selected target trace.

3. The method of claim 2, further comprising gridding the aperture into a plurality of cells.

4. The method of claim 2, wherein the aperture is configured to include substantially all of the potential downward reflection points of the surface multiples for the selected target trace.

5. The method of claim 2, further comprising receiving the selected potential downward reflection point for the selected target trace.

6. The method of claim 5, further determining the pairs of recorded traces for substantially all of the potential downward reflection points of the selected target trace.

7. The method of claim 1, further determining the pairs of recorded traces.

8. The method of claim 7, further comprising storing information regarding the pairs of recorded traces in the file.

9. The method of claim 7, wherein determining the pairs of recorded traces comprises minimizing an objective function.

10. The method of claim 1, further comprising dividing the file into one or more subfiles.

11. The method of claim 1, further comprising dividing the file into one or more subfiles according to subsurface line pairs, wherein each pair of recorded traces within each subfile comes from a pair of subsurface lines.

12. The method of claim 1, further comprising extracting a plurality of recorded traces that correspond to the information regarding the pairs of recorded traces.

13. The method of claim 12, further comprising correcting the offsets of the extracted recorded traces to an offset of the desired shot-side trace and an offset of the desired receiver-side trace.

14. The method of claim 12, further comprising applying a differential moveout correction to the extracted recorded traces to correct the offsets of the extracted recorded traces.

15. The method of claim 1, further comprising sorting the convolutions according to target traces.

16. A method for predicting a plurality of surface multiples for a plurality of target traces in a record of seismic data, comprising:
   (a) selecting a target trace;
   (b) selecting a potential downward reflection point for the selected target trace;
   (c) computing at least one of a desired shot-side midpoint, offset and azimuth, and at least one of a desired receiver-side midpoint, offset and azimuth using the selected potential downward reflection point and the selected target trace, wherein the desired shot-side midpoint, offset and azimuth define a desired shot-side trace and the desired receiver-side midpoint, offset and azimuth define a desired receiver-side trace;
   (d) determining a pair of recorded traces substantially closest to the desired shot-side trace and to the desired receiver-side trace; and
   (e) convolving, using a computer, the pair of recorded traces to generate a convolution.

17. The method of claim 16, further comprising creating a file containing information regarding the pair of recorded traces.

18. The method of claim 16, further comprising repeating steps (a) through (e) for all the potential downward reflections points for each target trace.

19. The method of claim 18, further comprising stacking a plurality of convolutions for each target trace.

* * * * *